(12) United States Patent
Price (10) Patent No.: US 7,854,696 B2
(45) Date of Patent: Dec. 21, 2010

(54) ROLLING PIN WITH ADJUSTABLE OFFSET

(75) Inventor: Robert Price, Brooklyn, NY (US)

(73) Assignee: Lifetime Brands, Inc., Garden City, NY (US)

( * ) Notice: Subject to any disclaimer, the term of this patent is extended or adjusted under 35 U.S.C. 154(b) by 990 days.

(21) Appl. No.: 11/622,376

(22) Filed: Jan. 11, 2007

(65) Prior Publication Data

US 2007/0207907 A1    Sep. 6, 2007

Related U.S. Application Data

(60) Provisional application No. 60/758,267, filed on Jan. 11, 2006.

(51) Int. Cl.
*B25F 5/02* (2006.01)
*F16C 13/00* (2006.01)

(52) U.S. Cl. .......................................... 492/57; 492/14

(58) Field of Classification Search ................... 492/14, 492/57
See application file for complete search history.

(56) References Cited

U.S. PATENT DOCUMENTS

| | | | |
|---|---|---|---|
| 39,916 A * | 9/1863 | Heissenbuttel | 425/374 |
| 353,177 A * | 11/1886 | Taylor | 492/14 |
| 359,480 A * | 3/1887 | Wolff et al. | 30/307 |
| 434,262 A * | 8/1890 | Freeman | 492/14 |
| 434,295 A * | 8/1890 | Richardi | 492/14 |
| 534,460 A * | 2/1895 | Wolff et al. | 492/11 |
| 534,560 A * | 2/1895 | Finfrock | 548/458 |
| 550,337 A * | 11/1895 | Finfrock et al. | 492/11 |
| 1,534,907 A * | 4/1925 | Broecker | 7/111 |
| 1,572,572 A * | 2/1926 | Straka | 30/73 |
| 1,810,050 A * | 6/1931 | Klempp | 492/14 |
| 2,339,492 A * | 1/1944 | Lewis | 100/336 |
| 2,673,532 A * | 3/1954 | Stair | 7/111 |
| 2,920,389 A * | 1/1960 | Nurmi | 30/307 |
| 3,994,652 A * | 11/1976 | Kuzyk | 425/298 |
| 4,045,850 A * | 9/1977 | Brandes | 492/10 |
| 4,435,145 A * | 3/1984 | Abrams | 425/458 |
| 4,521,174 A * | 6/1985 | Kornhauser | 425/194 |
| 4,718,769 A * | 1/1988 | Conkey | 366/69 |
| 5,437,593 A * | 8/1995 | Gustavsen | 492/13 |
| 6,520,464 B1 * | 2/2003 | Morrissey et al. | 248/222.52 |
| 7,033,309 B1 * | 4/2006 | Davis | 492/14 |

* cited by examiner

*Primary Examiner*—David P Bryant
*Assistant Examiner*—Jacob J Cigna
(74) *Attorney, Agent, or Firm*—Ryan A. Schneider, Esq.; Troutman Sanders LLP (57) ABSTRACT

A rolling pin with an adjustable offset for flattening or rolling out dough at a consistent thickness. The adjustable offset rolling pin includes a rolling pin body; a removable offset system for maintaining the rolling pin body a predetermined distance above a surface; a locking system for temporarily maintaining the offset system adjacent the rolling pin body; and a triggering mechanism for disengaging the locking system during the addition or removal of the offset system. More specifically, the adjustable offset rolling pin includes a rolling pin body; a plurality of end caps partially received by the rolling pin body; a plurality of handles adapted for engagement with the end caps; a plurality of push-buttons partially received within the handles; a plurality of offset discs configured to engage the end caps; and an offset disc holder adapted to store the plurality of offset discs during non-use.

5 Claims, 7 Drawing Sheets

ROLLING PIN WITH ADJUSTABLE OFFSET

CROSS REFERENCE TO RELATED APPLICATION

This application claims priority of U.S. Provisional Patent Application No. 60/758,267 filed 11 Jan. 2006, the entire contents of which is hereby incorporated by reference.

TECHNICAL FIELD

The present invention relates generally to a rolling pin and, in particular, to a rolling pin with an adjustable offset.

BACKGROUND OF THE INVENTION

One of the most common mixtures used in preparing breads, pastries, cookies, and other foods is flour dough, which is generally created by combining flour with eggs, yeast, and/or a liquid such as water or milk. Once prepared, the dough is usually flattened to a desired thickness using a common rolling pin having a cylindrical shape with a handle on each end. To accomplish the flattening of the dough, an individual typically places the rolling pin at the center of the dough and rolls the rolling pin outwardly along the general radii of the dough, while applying a steady downward pressure on the handles. The individual repeats this procedure until the dough is at a desired thickness.

Obtaining a consistent thickness throughout the dough is often difficult with the use of a common rolling pin, especially when the batch of dough covers the majority of the surface on which the dough is being flatted or rolled. An individual often has a difficult time determining the actual thickness of the dough above the working surface. Further, a constant downward pressure must be applied during the flattening of the dough; otherwise (if more pressure is applied on one portion of the dough than on another portion) the thickness of the dough will not be uniform. Accordingly, portions of the dough will not be of the appropriate and desired thickness for use.

To address the difficulty in achieving a uniform thickness of the dough, rolling pins have been modified to use gauge or offset wheels. Generally, the gauge wheels are placed near the ends of the rolling pin near the handles, thereby raising the body of the rolling pin a predetermined distance from the surface on which the dough is placed. Although appropriate for their intended purposes, the addition of gauge wheels to the rolling pin is generally cumbersome and often requires the use of a separate tool, such as a screwdriver or wrench, to add or remove the gauge wheels from the rolling pin. Further, only one set of gauge wheels is generally provided, thereby only allowing the rolling pin to roll or flatten the dough at one predetermined thickness.

What is needed is an adjustable offset rolling pin that can be adjusted to multiple offsets, whereby different predetermined thicknesses of the dough can be achieved by the rolling pin. Further, what is needed is an adjustable offset rolling pin that can be easily, but effectively, adjusted from one offset to another without the use of a separate tool. It is to such a device that the present invention is primarily directed.

BRIEF SUMMARY OF THE INVENTION

Briefly described, in preferred form, the present invention is a rolling pin with an adjustable offset for flattening or rolling out dough at a consistent thickness. The adjustable offset rolling pin includes a rolling pin body; a removable offset system for maintaining the rolling pin body a predetermined distance above a surface; a locking system for temporarily maintaining the offset system adjacent the rolling pin body; and a triggering mechanism for disengaging the locking system during the addition or removal of the offset system.

More specifically, the adjustable offset rolling pin comprises a rolling pin body; a plurality of end caps partially received by the rolling pin body; a plurality of handles adapted for engagement with the end caps; a plurality of push-buttons partially received within the handles; a plurality of offset discs configured to engage the end caps; and an offset disc holder adapted to store the plurality of offset discs during non-use. The locking system includes the interplay between an end cap and a handle, such that when a handle engages an end cap, the end cap temporarily maintains the handle in a locked or attached position. The triggering mechanism includes the interplay between the end cap and a push-button partially contained within the handle. As a triggering force is applied to the push-button, the end cap disengages with the handle, thereby allowing the handle to be removed from the end cap (e.g., an unlocked or detached position). Accordingly, an offset disc can be positioned adjacent the end cap prior to the handle being attached to the end cap. Once the handle is attached to the end cap, the offset disc is temporarily maintained adjacent the end cap during use of the rolling pin. To remove the offset disc, the triggering mechanism is activated by applying a triggering force to the push-button within the handle. The handle is then released from the end cap, thereby permitting the offset disc to be removed or replaced.

The offset system includes at least one pair of offset discs (typically of generally equivalent diameters), such that a first offset disc is positioned adjacent a first end of the rolling pin and a second offset disc is positioned adjacent a second end of the rolling pin. The first end and second end of the rolling pin are generally engaged with a first and second end cap prior to the positioning of the first and second offset discs. As described above, the offset discs are positioned with the rolling pin handles temporarily removed. Once the offset discs are positioned at each end of the rolling pin (e.g., adjacent the first and second end caps), a first handle is attached to the first end cap and a second handle is attached to the second end cap. The locking system maintains the first and second handles in the locked or attached position, thereby maintaining the first and second offset discs in an adjacent position next to the first and second end caps. Further, the offset system can include a plurality of pairs of offset discs, such that each pair of offset discs has a different diameter and, therefore, corresponds to a different offset or distance between the rolling pin body and the surface in which the rolling pin will be applied.

A principle object of the present invention is to provide a rolling pin with an adjustable offset, thereby allowing a user to roll or flatten dough at a consistent thickness.

Another object of the present invention is to provide an adjustable offset rolling pin including an offset system adapted to modify the distance between the rolling pin and a surface.

Still another object of the present invention is to provide an adjustable offset rolling pin with a locking system to maintain the offset system adjacent the rolling pin during use.

It is another object of the present invention to provide an adjustable offset rolling pin with a triggering mechanism adapted to release the offset system from a locked position during non-use of the rolling pin.

Yet another object of the present invention is to provide an offset system including a plurality of pairs of offset discs that can be positioned on each side of a rolling pin body to maintain the rolling pin a predetermine distance from a surface during use.

Still another object of the present invention is to provide a plurality of end caps adapted to engage each end of the rolling pin, such that the end caps assist in aligning and locking the offset discs to the rolling pin.

It is another object of the invention to provide a plurality of removable handles for the rolling pin, such that the removable handles lock into place by the locking system, thereby maintaining the pair of offset discs in a position adjacent the rolling pin.

Yet another object of the present invention is to provide a plurality of push-buttons used to trigger the locking system to release the handles from the rolling pin, thereby permitting the offset discs to be removed or replaced.

Still another object of the present invention is to provide an offset disc holder adapted to temporarily store the offset discs during non-use.

These and other objects, features and advantages of the present invention will become more apparent upon reading the following specification in conjunction with the accompanying drawings.

DETAILED DESCRIPTION OF THE PREFERRED EMBODIMENTS

Figure 1A:
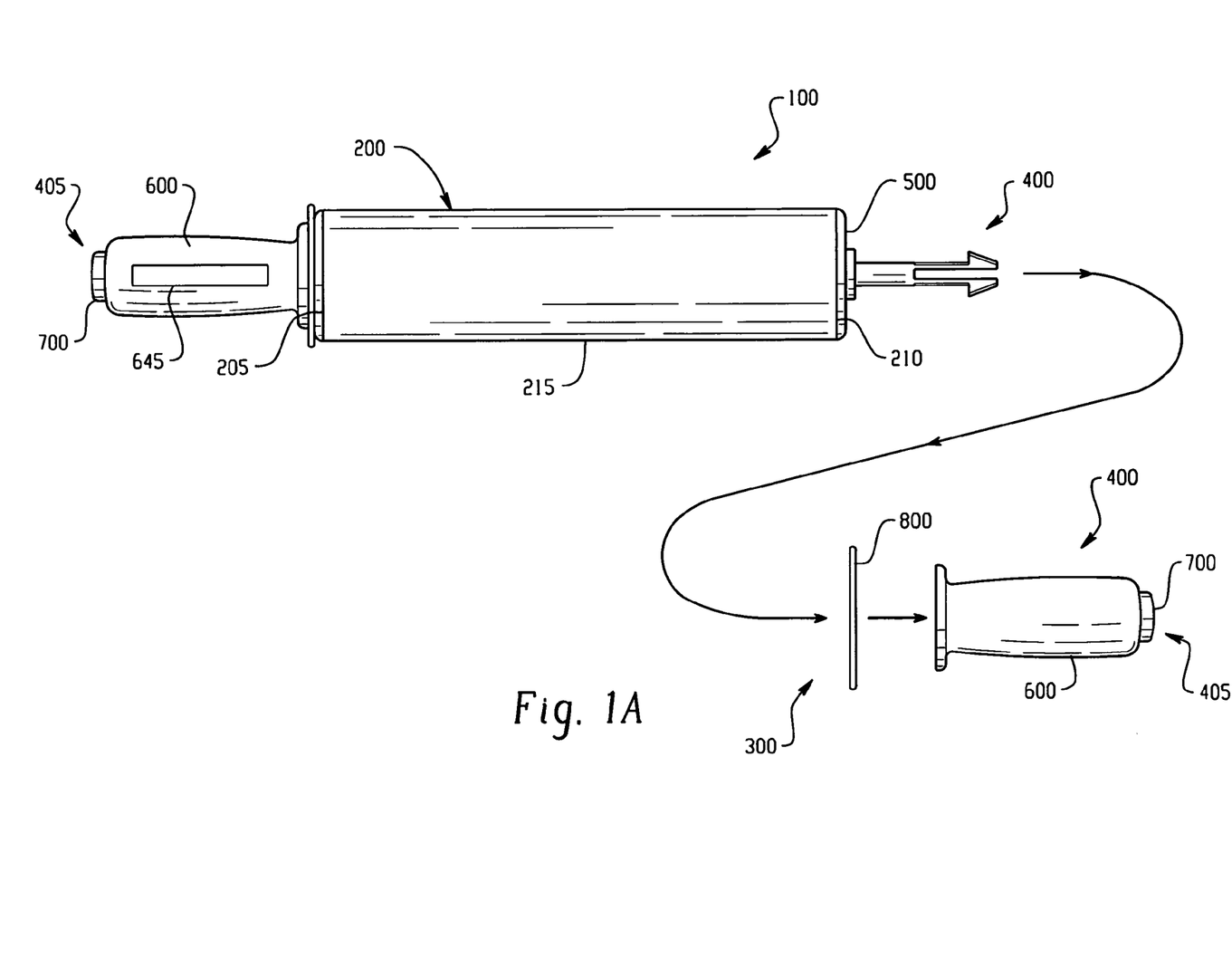
FIGS. 1A-1C, collectively known as FIG. 1, illustrate perspective and sectional views of an adjustable offset rolling pin in accordance with preferred embodiments of the present invention.
Figure 1B:
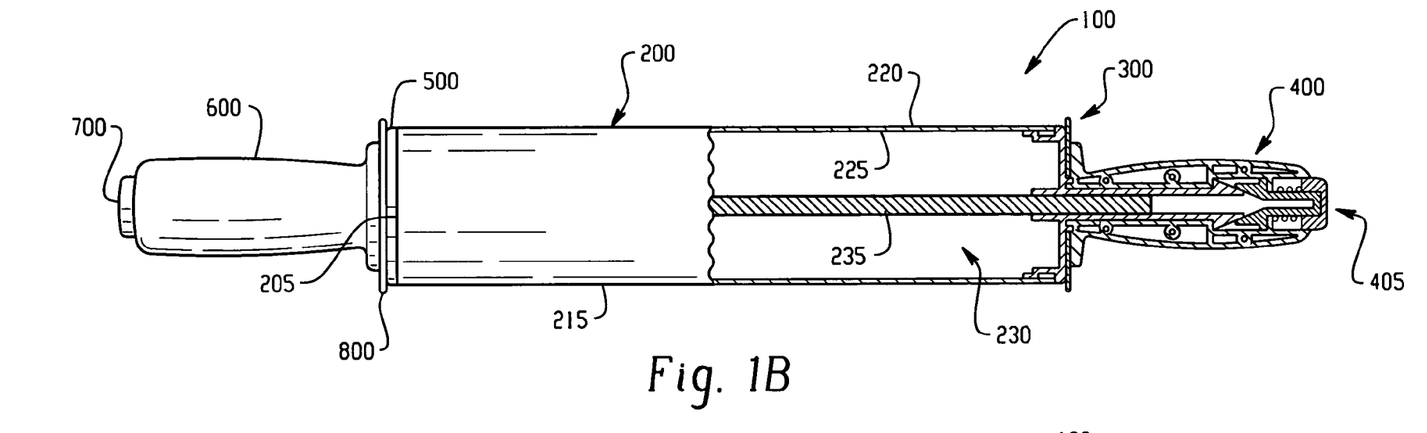
Figure 1C:
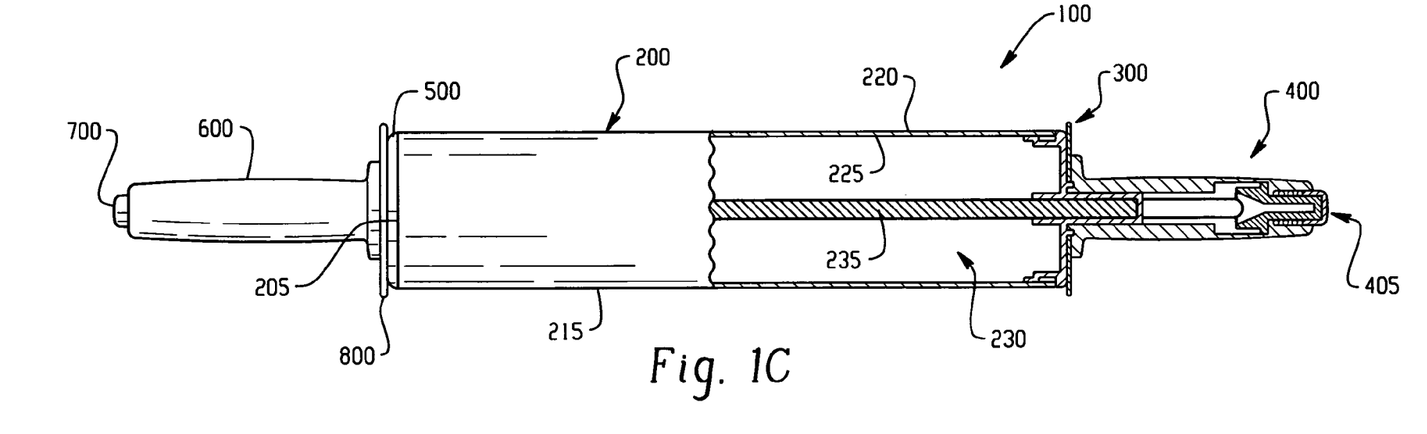

Referring now in detail to the drawing figures, wherein like reference numerals represent like parts throughout the several views, an adjustable offset rolling pin 100 of FIG. 1 facilitates the use of a rolling pin 100 at different and adjustable offsets, thereby permitting a user to flatten or roll out a material (such as dough) at predetermined thicknesses. The adjustable offset rolling pin 100 is designed for easy adjustment from one offset to another, while securely maintaining the adjustable offset rolling pin 100 at a predetermined offset during active use. As described herein, the offset of the rolling pin 100 refers to the distance between the roller (e.g., rolling surface of the rolling pin 100) and the surface on which the rolling pin 100 will be applied.

As shown in FIGS. 1A-1C, the adjustable offset rolling pin 100 comprises a rolling pin body 200 (also referred to as a roller 200), an offset system 300, and a locking system 400. The locking system 400 is adapted to temporarily maintain the offset system 300 adjacent to the rolling pin body 200 when the locking system 400 is in a locked state. The locking system 400 comprises a triggering mechanism 405 that, when triggered, deactivates the locking system 400, thereby moving the locking system 400 from the locked state to an unlocked state. In the unlocked state, the offset system 300 can be replaced or removed from the rolling pin body 200.

The offset system 300 is adapted to adjust to a plurality of predetermined offsets. Generally, the adjustment of the offset system 300 requires the locking system 400 to be in the unlocked state, so that the offset system 300 can be easily replaced or removed from the rolling pin body 200. For example and not limitation, the offset system 300 can be configured to provide incremental offsets such as ¼ inch, ½ inch, ¾ inch, and 1 inch. One skilled in the art will recognize that the plurality of predetermined offsets of the offset system 300 can be configured to represent any suitable unit of measure of distance including, but not limited to, the English system or the metric system. Accordingly, the offset system 300 ensures that the offset distance of the rolling pin 100 can represent a plurality of discrete and predetermined distances.

More specifically, the adjustable offset rolling pin 100 comprises a rolling pin body 200, a plurality of end caps 500, a plurality of handles 600, a plurality of push-buttons 700, and a plurality of offset discs 800. The rolling pin body 200 (or roller 200) includes an open first end 205, an open second end 210, and a peripheral side wall 215 that extends from the open first end 205 to the open second end 210. The peripheral side wall 215 defines an inner cavity 230 within the rolling pin body 200, whereby the peripheral side wall 215 includes an inner side wall 225 adjacent to the inner cavity 230 and an outer side wall 220 facing opposite the inner side wall 225. The outer side wall 220, therefore, defines the rolling surface of the adjustable offset rolling pin 100 which will come into contact with the material to be rolled out or flattened. The rolling pin body 200 can further include a rolling rod 235 positioned within the inner cavity 230. Generally, the rolling rod 235 is positioned in the approximate center of the inner cavity 230, such that the rolling rod 235 is aligned generally parallel to the peripheral side wall 215 and extends from the open first end 205 to the open second end 210. The rolling rod 235 assists in the rolling action of the adjustable offset rolling pin 100 and is adapted to engage the end caps 500, as described more fully below.

Typically, the rolling pin body 200 comprises a cylindrical shape, whereby the open first end 205 and the open second end 210 are generally uniform in size. The thickness of the rolling pin body 200 can vary, but is generally suitable for the extensive use and the pressure asserted when rolling the rolling pin 100 over the material during use. Further, the outer side wall 220 of the rolling pin body 200 can include a non-stick coating to prevent the rolling pin 100 from undesirably sticking to the material during the rolling out or flattening process.

As illustrated in FIGS. 1 and 2A-2C, the end cap 500 is adapted to engage the open first end 205 and/or open second end 210 of the rolling pin body 200. In a preferred embodiment of the present invention, a first end cap 500 engages the open first end 205 of the rolling pin body 200 and a second end cap 500 engages the open second end 210 of the rolling pin body 200. The end caps 500 effectively enclose the inner cavity 230 of the rolling pin body 200.

Figure 2A:
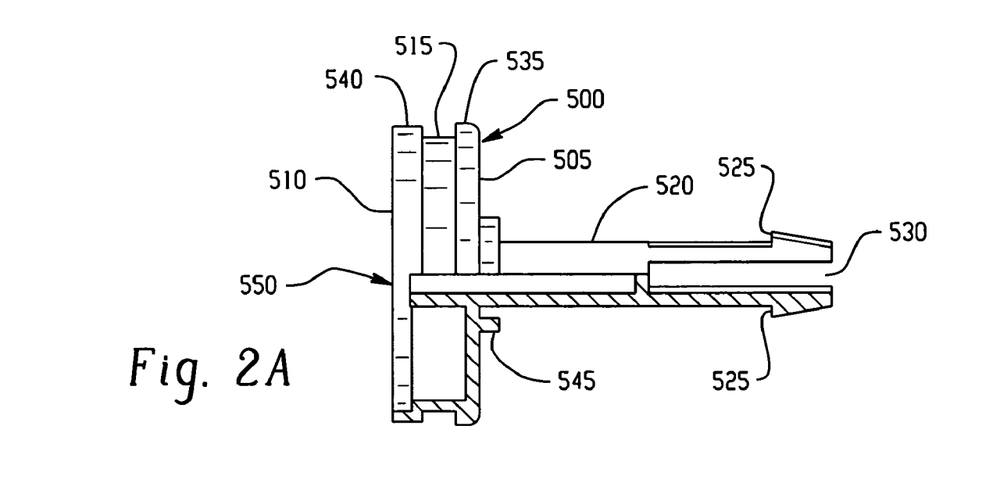
FIGS. 2A-2C, collectively known as FIG. 2, illustrate perspective and sectional views of an end cap of the adjustable offset rolling pin in accordance with preferred embodiments of the present invention.
Figure 2B:
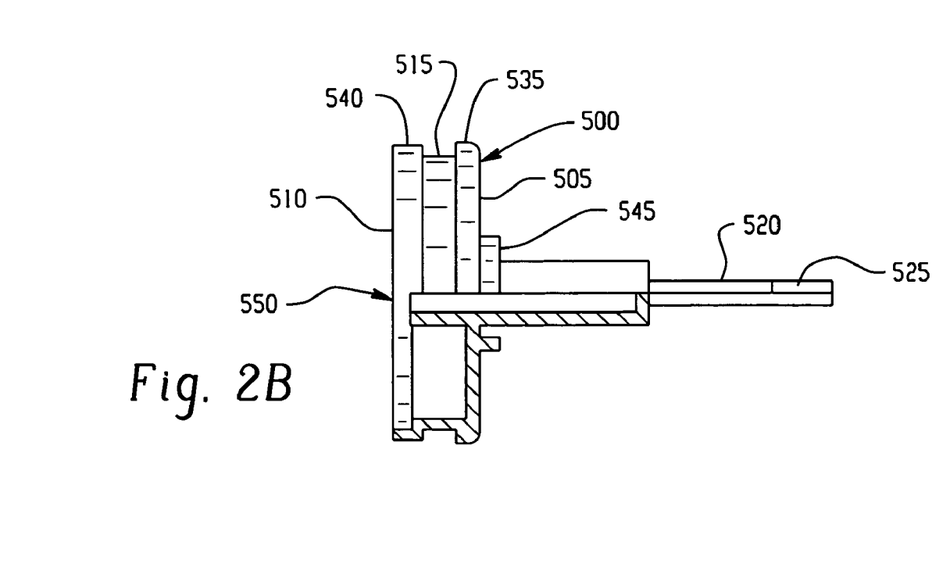
Figure 2C:
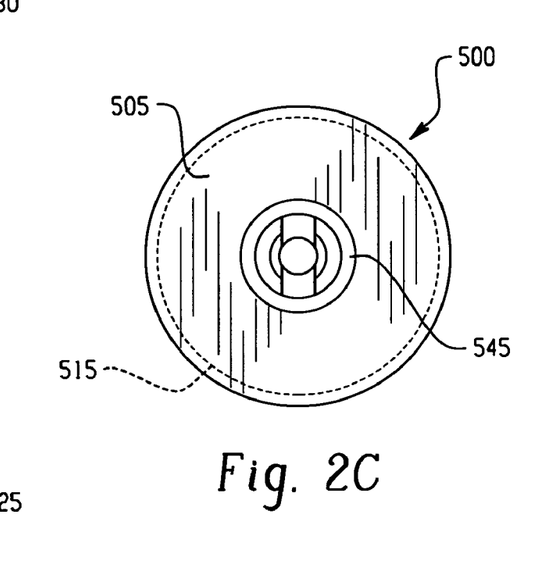
Figure 3A:
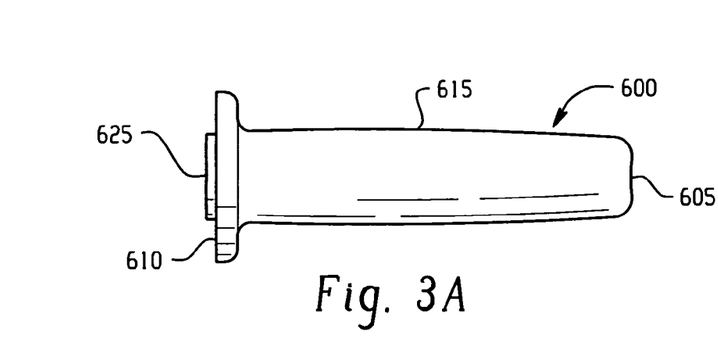
FIGS. 3A-3F, collectively known as FIG. 3, illustrate perspective and sectional views of a handle of the adjustable offset rolling pin in accordance with preferred embodiments of the present invention.
Figure 3B:
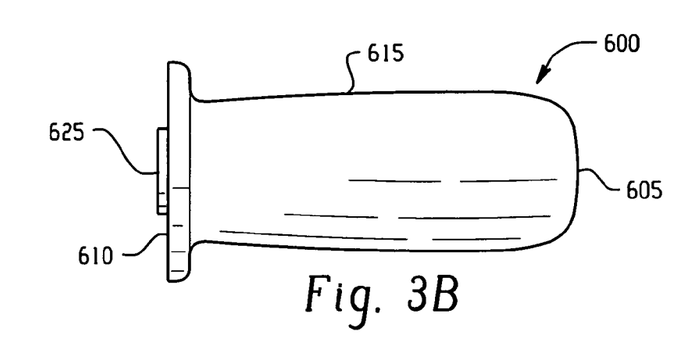
Figure 3C:
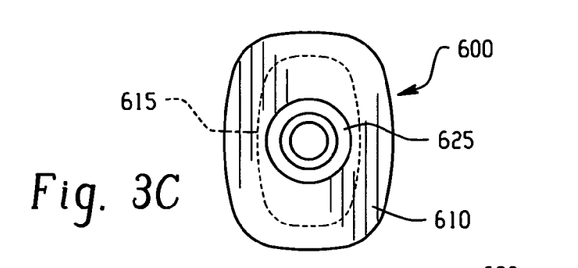
Figure 3D:
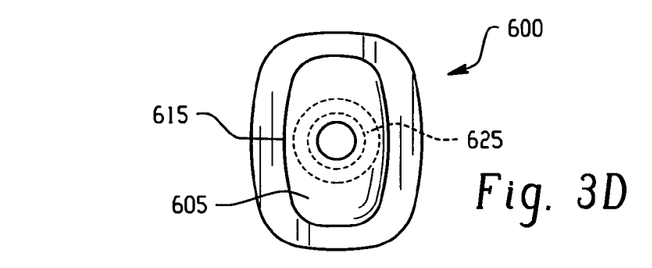
Figure 3E:
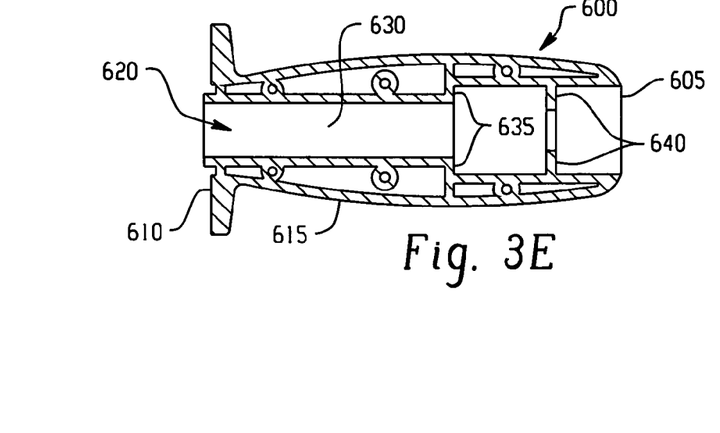
Figure 3F:
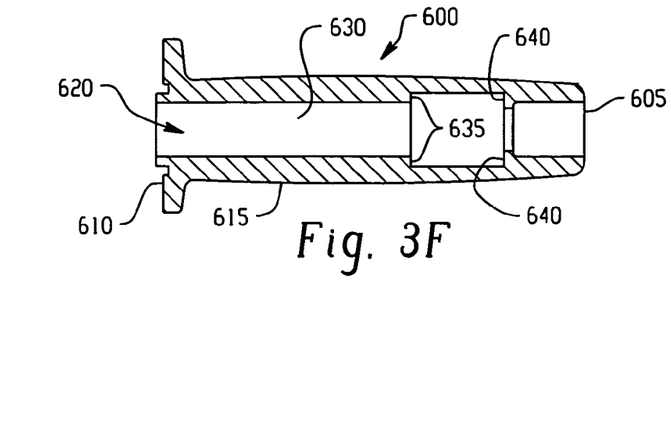
Figure 4A:
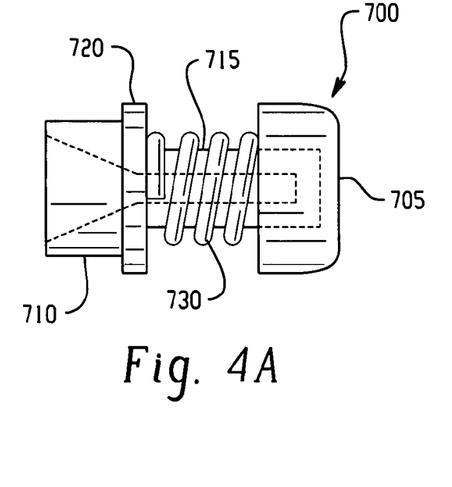
FIGS. 4A-4E, collectively known as FIG. 4, illustrate perspective and sectional views of a push-button (triggering mechanism) of the adjustable offset rolling pin in accordance with preferred embodiments of the present invention.
Figure 4B:
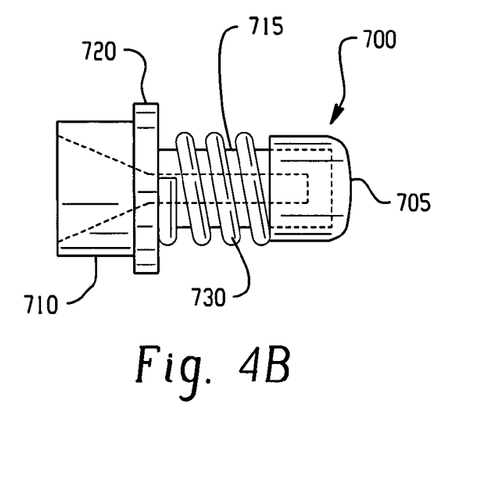
Figure 4C:
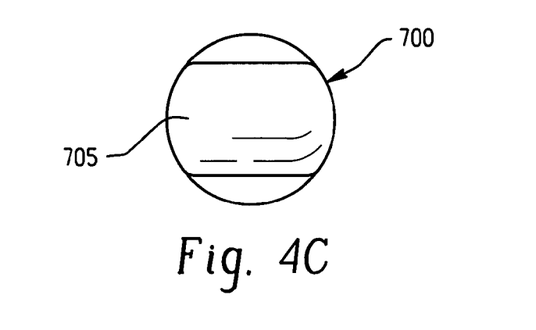
Figure 4D:
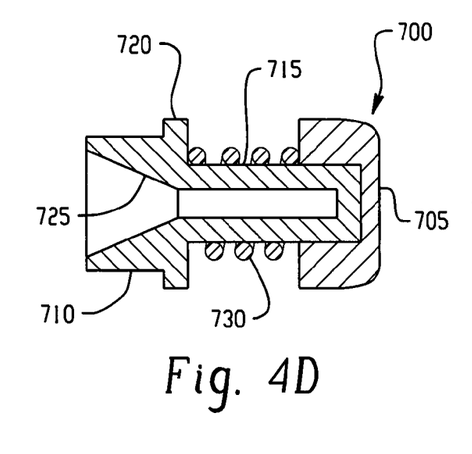
Figure 4E:
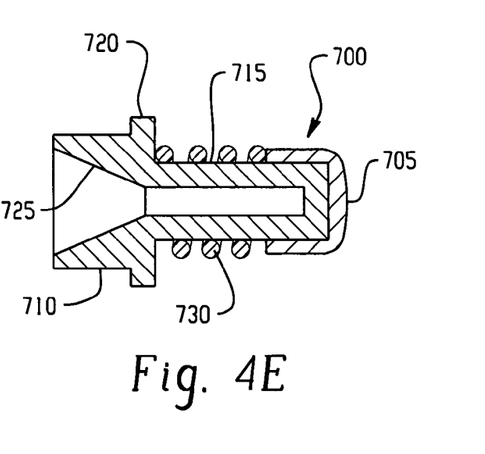
Figure 5A:
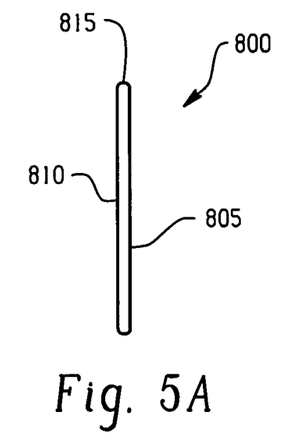
FIGS. 5A-5D, collectively known as FIG. 5, illustrate perspective views of an offset disc of the adjustable offset rolling pin in accordance with preferred embodiments of the present invention.
Figure 5B:
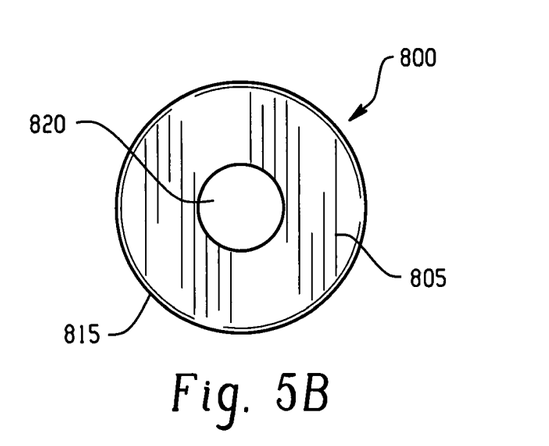
Figure 5C:
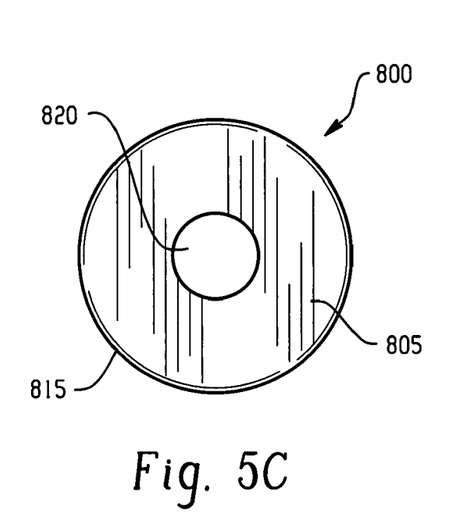
Figure 5D:
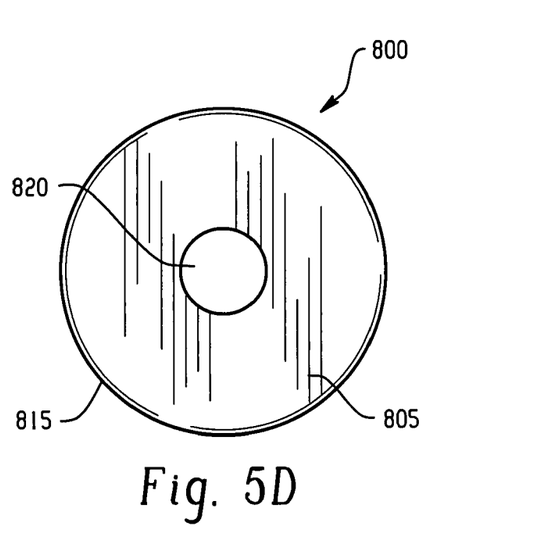

Each end cap 500 includes a top 505, a bottom 510, and a peripheral side wall 515 extending from the top 505 to the bottom 510. As the end cap 500 is adapted to engage and be partially received within the rolling pin body 200, the end cap 500 is generally of the same cylindrical shape as the rolling pin body 200. The end cap 500 is positioned within the open first end 205 or open second end 210 of the rolling pin body 200, such that the bottom 510 of the end cap 500 is received within the inner cavity 230 of the rolling pin body 200, while the top 505 faces outwardly from the end of the rolling pin body 200.

A handle receiving extension 520 extends outwardly from the top 505 of the end cap 500. Generally, the handle receiving extension 520 is aligned generally parallel with the peripheral side wall 215 of the rolling pin body 200. The handle receiving extension 520 is adapted to receive a handle 600, as described more fully below. The handle receiving extension 520 includes a plurality of locking catches 525 positioned at the outwardly extending end of the handle receiving extension 520. The locking catches 525 assist the locking system 400 in maintaining the offset system 300 and handle 600 in a locked state.

The handle receiving extension 520 is formed to define a slot 530 between the plurality of latching catches 525. The slot 530, therefore, is generally positioned at the outwardly extending end of the handle receiving extension 520. The slot 530 provides some flexibility to the outwardly extending end of the handle receiving extension 520, thereby permitting the latching catches 525 to be slightly pinched or moved inwardly towards each other.

The end cap 500 further comprises a lip 535 positioned around the perimeter of the top 505 of the end cap 500. The lip 535 is slightly larger in diameter than the open first end 205 and open second end 210 of the rolling pin body 200. Accordingly, as the end cap 500 is inserted into the inner cavity 230 of the rolling pin body 200, the lip 535 engages the perimeter of the open first end 205 or open second end 210. The lip 525 prevents the end cap 500 from being received beyond a predetermined position within the inner cavity 230 of the rolling pin body 200.

Moreover, the end cap 500 includes a rim 540 positioned around the perimeter of the bottom 510 of the end cap 500. The rim 540 is generally equivalent in diameter as the open first end 205 and open second end 210 of the rolling pin body 200. The rim 540 is adapted to snuggly engage the inner side wall 225 of the peripheral side wall 215 when inserted into the inner cavity 230 of the rolling pin body 200. The rim 540 effectively seals the end cap 500 with the rolling pin body 200, and thus temporarily maintains the engagement of the end cap 500 and the rolling pin body 200. One skilled in the art will recognize that the rim 540 can comprise a gasket, o-ring, or other suitable sealant.

The bottom 510 of the end cap 500 can be formed to define an aperture 550 for receiving an end of the rolling rod 235. The end cap 500, therefore, assists in maintaining the rolling rod 235 near the approximate center of the inner cavity 230 of the rolling pin body 200. For example and not limitation, the rolling rod 235 can extend a predetermined distance beyond the open first end 205 and the open second end 210 of the rolling pin body 200. As configured, the aperture 505 permits the extending end of the rolling rod 235 to be partially received by the end cap 500.

The top 505 of the end cap 500 can also include a collar 545 extending outwardly from the top 505. The collar 545 is positioned generally in the center of the top 505 of the end cap 500 and is adapted to engage the offset system 300 and a handle 600. In a preferred embodiment, the collar 545 has a diameter greater than the thickness of the handle receiving extension 520 of the end cap 500.

As illustrated in FIGS. 1 and 3A-3F, a handle 600 is adapted to engage the handle receiving extension 520 of the end cap 500. The handle 600 comprises an open upper end 605, an open lower end 610, and a peripheral side wall 615 extending from the open upper end 605 to the open lower end 610. The peripheral side wall 615 defines a cavity 620 within the handle 600, such that the handle receiving extension 520 can be adequately received within the cavity 620 of the handle 600. In an embodiment, the open upper end 605 and open lower end 610 are ellipsoidal in shape, thereby causing the peripheral side wall 615 to form an ellipsoidal handle shape. The ellipsoidal shape of the handle 600 provides a more ergonomic and comfortable handle 600 for the user during operation of the adjustable offset rolling pin 100. In other words, the width of the top and bottom of the handle 600 is significantly greater than the sides of the handle 600.

The handle 600 further comprises a collar 625 extending outwardly from the open lower end 610. The diameter of the collar 625 of the handle 600 is generally less than the diameter of the collar 545 of the end cap 500, such that when the handle 600 is engaged with the end cap 500, the collar 625 of the handle 600 is adequately received within the collar 545 of the end cap 500. Although the handle 600 engages the end cap 500, the rotation of the handle 600 and the rolling pin body 200 are mutually exclusive, even when the locking system 400 is in the locked state. Accordingly, the user can roll the rolling pin 100 over the material, whereby the rolling pin body 200 rotates freely, but the handle 600 can remain stationary within the user's hands.

The cavity 620 of the handle 600 includes a channel 630 having a varying diameter. The non-uniform channel 630 is defined by the inner wall of the peripheral side wall 615 of the handle 600. For example and not limitation, a first portion of the channel 630 located near the open lower end 610 can include a first diameter, while a second portion of the channel 630 located near the middle or open upper end 605 of the handle 600 includes a second, larger diameter. Further, the second portion of the channel 630 can be divided into two sections, whereby a first section positioned near the middle of the handle 600 is adapted to receive the locking catches 525 of the handle receiving extension 520 and a lower portion of a push-button 700, while a second section positioned near the open upper end 605 of the handle is adapted to partially receive an upper portion of the push-button 700, as described more fully below.

Within the cavity 620, the inner side of the peripheral side wall 615 defines a lower seat 635 adapted to temporarily engage the locking catches 525 of the handle receiving extension 520 when the locking system 400 is in the locked state. The lower seat 635 is generally positioned near the middle of the handle 600, such that the lower seat 635 defines a separation from the first portion of the channel 630 from the second portion of the channel 630.

Moreover, the inner side of the peripheral side wall 615 defines an upper seat 640 (or trigger seat 640) adapted to engage a lower portion of the push-button 700. The upper seat 640 is positioned near the open upper end 605 of the handle 600, whereby the upper seat 640 divides the second portion of the channel 630 into a first and second section. The upper seat 640 includes a lower side and an upper side in which the lower side engages the lower portion of the push-button 700, while the upper side engages the upper portion of the push-button 700. The upper seat 640 assists in maintaining the push-button 700 partially within the handle 600.

In another embodiment of the present invention, the handle 600 further comprises indicia 645 positioned on the outer side of the peripheral side wall 615. The indicia 645 can include, but is not limited to, a logo, text, measurement, symbol, or other appropriate markings. One skilled in the art will recognize that the indicia 645 can include any type of advertising or branding as is common in the marketing industry.

As illustrated in FIGS. 1 and 4A-4D, a push-button 700 includes a cap 705 (upper portion of the push-button 700), a base 710 (lower portion of the push-button 700), and a bias support 715 in communication with the cap 705 and the base 710. In a preferred embodiment, the push-button 700, when received within the handle 600, is positioned so that the base 710 is adjacent the lower side of the upper seat 640 (e.g., within the first section of the second portion of the channel 630) and the bias support 715 and cap 705 are positioned adjacent the upper side of the upper seat 640 (e.g., within the second section of the second portion of the channel 630). The base 710 of the push-button 700 comprises a base ridge 720 adapted to adequately engage the lower side of the upper seat 640.

The push-button 700 further includes a bias 730 surrounding the bias support 715. The bias 730 is positioned, such that a first end of the bias 730 is engaged with the bottom of the cap 705, while a second end of the bias 730 is engaged with the upper side of the upper seat 640. The bias 730 biases the push-button 700 towards the open upper end 605 of the handle 600. Accordingly, in a relaxed and non-energized state, the bias 730 pushes the cap 705 of the push-button 700 away from the upper seat 640 and towards the open upper end 605 of the handle 600. The base ridge 720 is, therefore, forced to engage the lower side of the upper seat 640. As a force is applied to the top of the cap 705 towards the cavity 620 of the handle 600, the bias 730 enters a compressed and energized state, while the bottom of the cap 705 moves toward the upper side of the upper seat 640. When the cap 705 is engaged with the upper side of the upper seat 640, the base 710 of the push-button 700 is positioned a predetermined distance away from the lower side of the upper seat 640 towards the middle of the cavity 620 of the handle 600.

One skilled in the art will recognize that the bias 730 can include, but is not limited to, a spring, a coil, a pressurized chamber, a flexible piece of metal, rubber, or plastic, or other appropriate device that is compressible, yet resilient. Preferably, the bias 730 is a spring, with enough resilience to effectively move the push-button 700 towards the open upper end 605 of the handle 600, so that the cap 705 is moved away from the upper side of the upper seat 640 and the base 710 is moved towards the lower side of the upper seat 640.

The base 710 of the push-button 700 includes a locking release 725 positioned at the bottom of the base 710. The locking release 725 is adapted to engage the upper portion of the handle receiving extension 520 when the base 730 is moved away from the lower side of the upper seat 640 as a force is applied to the cap 705 of the push-button 700, thereby causing the locking release 725 to pinch or move the locking catches 525 inwardly towards the slot 530. As the locking catches 525 move inwardly towards the slot 530, the locking catches 525 disengage with the upper side of the lower seat 635, thereby permitting the handle receiving extension 520 to slide downwardly within the first portion of the channel 630 towards the open lower end 610 of the handle 600. In effect, the handle 600 is unlocked or released from the end cap 500, so that the handle 600 can be removed from the handle receiving extension 520.

Each offset disc 800, as illustrated in FIGS. 1 and 5A-5D, include a top 805, bottom 810, and a ridge 815 extending from the top 805 to the bottom 810. The offset disc 800 is formed to define an aperture 820 through the center of the top 805 and bottom 810. The aperture 820 is slightly larger in diameter than the collar 545 of the end cap 500, such that an offset disc 800 can slide over the collar 545, when positioned adjacent the end cap 500. The plurality of offset discs 800 can include multiple pairs of offset discs 800 having varying diameters. For example, a first pair of offset discs 800 includes a first diameter, such that, when attached to the end cap 500, the rolling pin 100 is a first predetermined distance from a surface during use. A second pair of offset discs 800 includes a second diameter larger than the first diameter, such that, when attached to the end cap 500, the rolling pin 100 is a second predetermined distance from the surface during use. A third pair of offset discs 800 includes a third diameter larger than the second diameter, such that, when attached to the end cap 500, the rolling pin 100 is a third predetermined distance from the surface during use. In this example, the first predetermined distance is smaller than the second predetermined distance, which is smaller than the third predetermined distance.

Further, each offset disc 800 can include a deboss positioned on the top 805, such that the debossed location on each of the offset discs 800 is the measurement in distance that the offset disc 800 will offset the rolling pin 100 from the applicable surface (e.g., countertop). For example and not limitation, the adjustable offset rolling pin 100 can include a first offset disc 800 having a deboss indicating the measurement of offset of the rolling pin 100 to be ¼ inch, a second offset disc 800 having a deboss indicating the measurement of the offset of the rolling pin 100 to be ½ inch, and a third offset disc 800 having a deboss indicating the measurement of offset of the rolling pin 100 to be ¾ inch. One skilled in the art will recognize that different measurements can be designated by a deboss on each offset disc 800 within the scope of the present invention.

In operation, with a first end cap 500 inserted into the open first end 205 of the rolling pin body 200 and a second end cap 500 inserted into the open second end 210 of the rolling pin body 200, a first offset disc 800 having a first predetermined diameter is positioned adjacent the top 505 of the first end cap 500 and a second offset disc 800 having the first predetermined diameter is positioned adjacent the top 505 of the second end cap 500. The offset discs 800 are positioned on the end caps 500, such that the collar 545 of each end cap 500 is received within the aperture 820 of the corresponding offset disc 800.

The locking system 400 includes the interplay between the handle receiving extension 520 of the end cap 500 and the handle 600. As a first handle 600 is applied to the handle receiving extension 520, the generally slanted edges of the upper portion of the handle receiving extension 520 engage the first portion of the channel 630 of the handle 600. As the slanted edges of the upper portion of the handle receiving extension 520 engage the first portion (e.g., the narrow portion) of the channel 630, the locking catches 525 are caused to move inwardly toward the slot 530. Such a movement of the locking catches 525 temporarily reduces the thickness of the upper portion of the handle receiving extension 520, thereby permitting the handle receiving extension 520 to be slideably received within the first portion of the channel 630, as the handle 600 is moved towards the top 505 of the end cap 500.

Once the locking catches 525 reach the first section of the second portion of the channel 630 (having a larger diameter than the first portion of the channel 630), the locking catches 525 naturally move away from the slot 530, thereby causing the upper portion of the handle receiving extension 520 to return to its original thickness. The locking catches 525 then engage the upper side of the lower seat 635 within the handle 600. Such engagement of the locking catches 525 with the lower seat 635 moves the locking system 400 into the locked state, whereby the handle 600 is temporarily maintained on the handle receiving extension 520 of the end cap 500. At the same time the locking catches 525 engage the lower seat 635, the collar 625 engages the top 505 of the end cap 500, such that the collar 625 of the handle 600 is received within the collar 545 of the end cap 500. Further, the open lower end 610 of the handle 600 engages the top 805 of the offset disc 800, thereby temporarily maintaining the offset disc 800 adjacent to the end cap 500.

In the locked state, the locking system 400 maintains the offset disc 800 adjacent to the end cap 500 and maintains the attachment of the handle 600 to the handle receiving extension 520. The adjustable offset rolling pin 100 can then be used by an individual to roll out or flatten a material, such as dough. The rolling pin body 200 is maintained a first predetermined distance from the surface by the first and second offset disc 800. Accordingly, the material can be evenly dispersed at a predetermined thickness defined by the offset discs 800.

The triggering mechanism 405 includes the interplay between the push-button 700 and the upper portion of the handle receiving extension 520. To remove or replace the offset discs 800, the locking system 400 must be moved from the locked state to the unlocked state so that the handle 600 can be removed from the handle receiving extension 520, in order for the offset disc 800 to be subsequently removed or replaced with an offset disc 800 of a different diameter. As the individual applies a triggering force to the cap 705 of the push-button 700, the base 710 of the push-button 700 is disengaged with the lower side of the upper seat 640 and moved towards the upper end of the handle receiving extension 520 within the first section of the second portion of the channel 630. As the lower portion of the cap 705 moves toward the upper side of the lower seat 635, the locking release 725 of the base 710 engages the slanted edges of the upper portion of the handle receiving extension 520. The locking release 725 can include corresponding slanted edges to properly engage the upper portion of the handle receiving extension 520, so that the locking catches 525 move inwardly toward the slot 530. Such a movement causes the locking catches 525 to disengage with the upper side of the lower seat 635. The thickness of the upper portion of the handle receiving extension 520 is temporarily reduced, thereby allowing the handle receiving extension 520 to move into the first portion of the channel 630 towards the open lower end 610 of the handle 600. Accordingly, the handle 600 can be effectively removed from the handle receiving extension 520. After the handle 600 has been removed, the locking catches 525 move back to their original positions.

As the triggering force is removed from the cap 705 of the push-button 700, the bias 730 causes the bottom of the cap 705 to disengage with the upper side of the upper seat 640. The bias 730 moves the cap 705 of the push-button 700 towards the open upper end 605 of the handle 600 until the base ridge 720 of the base 700 engages the lower side of the upper seat 640, thereby maintaining the push-button 700 temporarily within the handle 600.

Now, the user can remove the offset disc 800 from the collar 545 of the end cap 500. The user can then install a different offset disc 800 having a second predetermined distance to the end cap 500. One skilled in the art will recognize that by interchanging the offset discs 800 on the rolling pin 100, different distances between the rolling pin body 200 and the surface can be achieved.

Figure 6A:
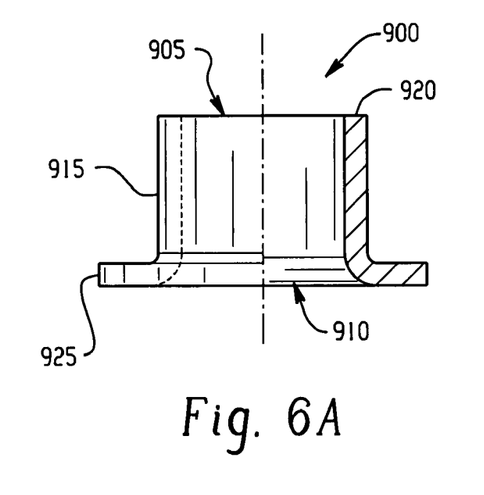
FIGS. 6A-6C, collectively known as FIG. 6, illustrate perspective and sectional views of an offset disc holder in accordance with preferred embodiments of the present invention.
Figure 6B:
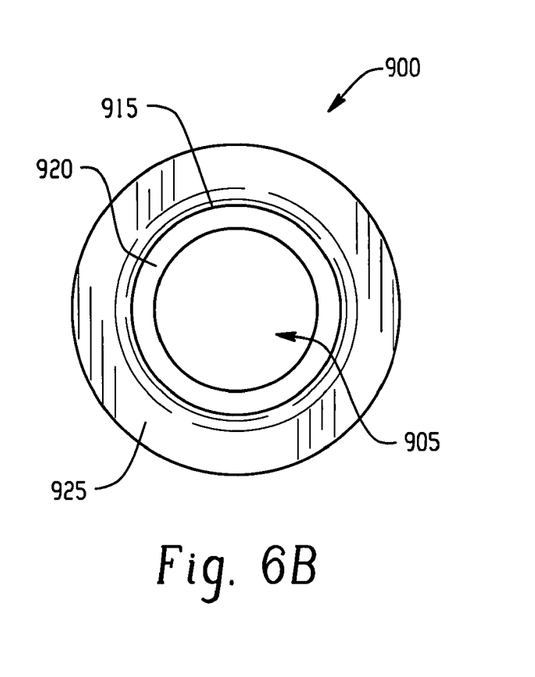
Figure 6C:
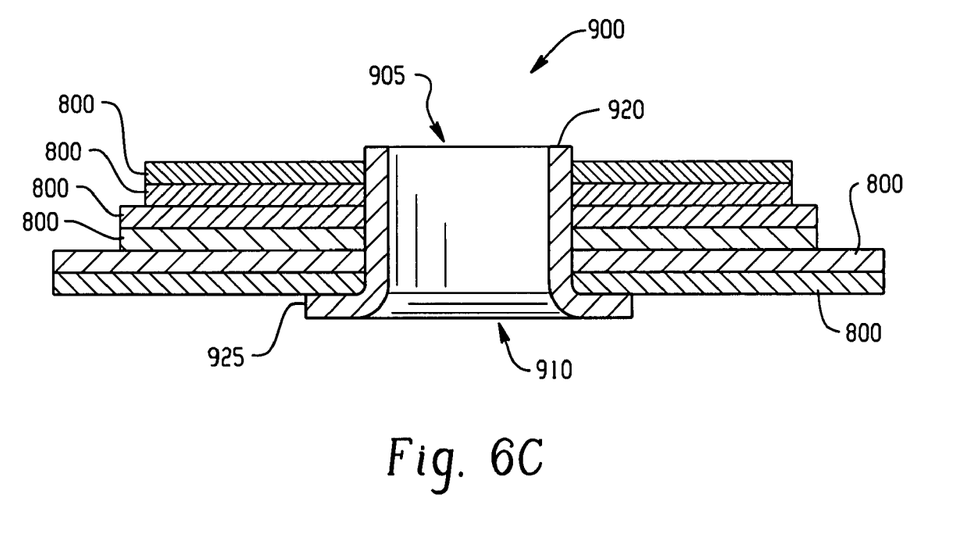

As illustrated in FIGS. 6A-6C, the adjustable offset rolling pin 100 can include an offset disc holder 900 adapted to temporarily store the plurality of offset discs 800 during non-use. The offset disc holder 900 includes an upper open end 905, a lower open end 910, and a peripheral side wall 915 extending from the upper open end 905 to the lower open end 910. The diameter of the offset disc holder 900 is approximately equal to the diameter of the aperture 820 of an offset disc 800. The offset disc holder 900 also includes a lower ridge 925 around the perimeter of the open lower end 910, such that the lower ridge 925 has a diameter greater than the diameter of the aperture 820 of the offset disc 800. Accordingly, the offset discs 800 can be seated onto the lower ridge 925 without sliding off of the bottom of the offset disc holder 900. Further, the offset disc holder 900 can include an upper ridge 920 having a diameter slightly larger than the diameter of the aperture 820 of the offset disc 800. The upper ridge 920 permits the offset discs to snap onto the offset disc holder 900, while also temporarily preventing the offset discs 800 from inadvertently sliding off of the top of the offset disc holder 900.

One skilled in the art will recognize that the rolling pin body 200, offset system 300, locking system 400, triggering mechanism 405, end caps 500, handles 600, push-buttons 700, offset discs 800, offset disc holder 900, and all of the components and/or elements thereof can be made of a variety of suitable materials including, but not limited to, plastic, rubber, metal, ceramic, or other suitable materials or a combination thereof.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A rolling pin comprising:
   a rolling pin body and end caps, the end caps adapted to engage and be partially received within the rolling pin body, each end cap having a top, a bottom, and a peripheral side wall extending from the top to the bottom, wherein the bottom of each end cap is received within an inner cavity of the rolling pin body, while the top of each end cap faces outwardly from an end of the rolling pin body;
   a removable offset system for maintaining the rolling pin body a predetermined distance above a surface;
   a handle in communication with each end cap, each handle including an open upper end, an open lower end, and a peripheral side wall extending from the open upper end to the open lower end, the peripheral side wall defining a cavity within the handle;
   a locking system for temporarily maintaining the offset system adjacent the rolling pin body, wherein the locking system includes the interplay of a handle receiving extension of each end cap and the cavity within the handle, wherein the handle receiving extension of each end cap extends outwardly from the top of each end cap, the handle receiving extension is adapted to receive the handle, the handle receiving extension including a plurality of locking catches positioned at an outwardly extending end of the handle receiving extension, and wherein the cavity within the handle has a channel varying in diameter, a first portion of the channel sized to cooperate with the locking catches of the handle receiving extension such that they do not temporarily maintain the offset system adjacent the rolling pin body, and a second portion of the channel having a lower seat, arranged so that when the locking catches of the handle receiving extension enter the second portion of the channel, the lower seat temporarily engages the locking catches, and temporarily maintains the offset system adjacent the rolling pin body; and a triggering mechanism for disengaging the locking system during the addition or removal of the offset system.

2. The rolling pin of claim 1, wherein the removable offset system includes a plurality of offset discs each designed to maintain the rolling pin body a different distance from the surface.

3. The rolling pin of claim 1, wherein the triggering mechanism comprises the end cap and a push-button partially contained within the handle.

4. The rolling pin of claim 2, wherein the plurality of offset discs comprise one or more pairs of discs with substantially equal dimensions.

5. The rolling pin of claim 3, wherein when a triggering force is applied to the push-button, the end cap disengages with the handle, thereby allowing the handle to be removed from the end cap.

* * * * *